United States Patent [19]

Byon

[11] Patent Number: 5,678,855
[45] Date of Patent: Oct. 21, 1997

[54] PYROTECHNIC INFLATOR USING A THERMOELECTRIC DEVICE

[75] Inventor: Sung-Kwang Byon, Seoul, Rep. of Korea

[73] Assignee: Daewoo Electronics Co., Ltd., Seoul, Rep. of Korea

[21] Appl. No.: 580,446

[22] Filed: Dec. 27, 1995

[30] Foreign Application Priority Data

Apr. 25, 1995 [KR] Rep. of Korea .................. 95-9719

[51] Int. Cl.$^6$ .................................... B60R 21/26
[52] U.S. Cl. .................. 280/736; 280/741; 280/735
[58] Field of Search .................. 280/736, 741, 280/735, 742; 422/167

[56] References Cited

U.S. PATENT DOCUMENTS

| | | | |
|---|---|---|---|
| 3,912,458 | 10/1975 | Fukuma et al. | 422/169 |
| 3,950,263 | 4/1976 | Fukuma et al. | 252/193 |
| 4,066,415 | 1/1978 | Kasama et al. | 422/167 |
| 5,028,070 | 7/1991 | Bender | 280/741 |
| 5,040,381 | 8/1991 | Hazen | 62/3.2 |
| 5,167,426 | 12/1992 | Mihu et al. | 280/735 |
| 5,301,979 | 4/1994 | Allard | 280/737 |

*Primary Examiner*—Christopher P. Ellis
*Attorney, Agent, or Firm*—Beveridge, DeGrandi, Weilacher & Young LLP

[57] ABSTRACT

A pyrotechnic inflator using a thermoelectric device decreases the temperature and pressure of a gas generated when the explosive of the inflator is detonated to simplify the structure thereof. The inflator includes the thermoelectric device for receiving a power from an electronic control unit to cool an inflator housing in a predetermined temperature, and a linear flow passage therein. A metal is installed to one side of the flow passage for eliminating minute particles included in the gas generated during the detonation of the explosive and lowering the temperature of the gas. Upon the power supply to the inflator, the inflator housing is cooled to reduce the temperature of the gas generated when the explosive of the inflator is detonated and to decrease the peak explosion pressure, thereby simplifying the structure and facilitating the manufacturing of the inflator.

8 Claims, 3 Drawing Sheets

PYROTECHNIC INFLATOR USING A THERMOELECTRIC DEVICE

BACKGROUND OF THE INVENTION

1. Field of the Invention

The present invention relates to an inflator of an air bag system for an automobile, and more particularly to a pyrotechnic inflator for decreasing the temperature and the pressure of the gas generated from the detonation of an explosive, and so simplifies the structure of the inflator.

2. Description of the Prior Art

An air bag system generally mounted to automobiles is a safety apparatus for protecting a driver or passenger in the event of a car crash. When an automobile collides with a certain object, a sensor monitors the movement of the automobile to supply an accelerative signal to a microcomputer. Based on the input accelerative signal, the microcomputer checks whether or not the driver or passenger (hereinafter simply referred to as "driver") is in danger, and unfolds the air bag to protect the driver if it is determined that the driver is faced with danger.

FIG. 1 is a view for showing a structure of a general air bag system. A plurality of collision sensors 4 for monitoring the collision of an automobile (not shown) are mounted to a predetermined place on the automobile. Collision sensors 4 typically comprise an acceleration sensor. When the automobile collides, the acceleration speed of the vehicle is drastically changed. This drastic change in acceleration speed leads collision sensors 4 to generate a changed accelerative signal which is provided to an electronic control unit (hereinafter referred to as "ECU") 3 including the microcomputer. When ECU 3 receives a collision generation signal to determine the impending danger of the driver or the passenger, it provides a control signal to an inflator 2 which is within the air bag system. Upon receiving the control signal from ECU 3, inflator 2 detonates an explosive therein. A gas of high temperature and high pressure produced during the detonation of the explosive is introduced into a bag module, which is mounted at a steering wheel and the like, to quickly unfold an air bag 1 in order to protect the driver. An inflator using an inert cool gas in place of the explosive is disclosed in U.S. Pat. No. 5,301,979 issued to John E. Allard. This inflator, however, contains the drawback of requiring an inflator housing capable of withstanding a high internal pressure for a long time.

FIG. 2 is a sectional view showing the structure of inflator 2 in a general air bag system. The inflator which instantaneously ejects high pressure gas to inflate the air bag in the conventional air bag system will be described with reference to FIG. 2. A housing 7 of inflator 2 is charged with explosive 5, which is an explosive substance such as a sodium nitrate, and explosive 5 is provided with an ignition agent 9 which is an igniting substance. An exploder 10 is embedded in ignition agent 9. A flow passage for ejecting the high temperature and high pressure gas produced while detonating explosive 5 into air bag 1 is formed to one side of housing 7. A metal filter 13 and a cooling filter 11, which is a ceramic filter, are formed at the starting point of the flow passage, and are mounted to permit the flow passage to have a crooked shape like a horizontal tilde mark.

When the control signal is supplied from ECU 3, exploder 10 of inflator 2 is detonated to ignite ignition agent 9. At the same time, explosive 5 violently bursts to generate the high temperature and high pressure gas. Then, the high temperature and high pressure gas is supplied to the bag module via the gas flow passage to promptly unfold air bag 1.

Once the air bag is inflated by the inflow of the high temperature and high pressure gas generated from the inflator, the body of the driver contacting the air bag would either burn due to the high temperature of the gas or suffer a mortal wound due to the high pressure of the gas. In order to prevent such as a fatal blow, the inflator of the air bag is formed to have a gas flow passage with a plurality of crooked planes shaped as the horizontal tilde mark without a linear shape, for relieving the explosion.

In addition, the flow passage is provided with a plurality of metal filter 13 and cooling filters 11, which are comprised of ceramic or are made of a nonwoven net via a rivet coupling or laser welding. Cooling filter 11 eliminates minute particles produced from the detonation of the explosive and lowers the temperature of the gas generated while detonating the explosive within the inflator.

The inflator of the conventional air bag system constructed as above is formed to have the gas flow passage therein which has the plurality of crooked planes for lowering the pressure of the gas resulting from the explosive being detonated. Also, the cooling apparatus incorporated with the plurality of filters, such as the metal filter and the cooling filter, for cooling the high temperature gas emitted from the inflator is mounted thereto. Therefore, the structure of the inflator is complicated, and a high-grade housing architecture is required, thereby raising the manufacturing cost of the air bag system.

SUMMARY OF THE INVENTION

Accordingly, it is an object of the present invention to provide a pyrotechnic inflator for reducing pressure when the explosive is detonated to simplify the structure thereof.

To achieve the above object of the present invention, there is provided an inflator, which includes a housing, which has a space filled with an explosive substance therein, and an opening which forms a linear flow passage for ejecting gas generated by detonation of the explosive substance in an air bag. Here, the explosive substance is detonated by an ignition agent, which is embedded within an exploder and is activated by an explosion signal to ignite the ignition agent. In addition to these, to cool the housing down to a predetermined temperature, a thermoelectric device is provided for receiving current.

Preferably, the thermoelectric device is formed at the outer periphery of the housing. The thermoelectric device is supplied with the current from a power source, and the current supply from the power source to the thermoelectric device is controlled by an electronic control unit. Here, the thermoelectric device includes a heat sink for evolving heat, a heat source disposed opposite to the heat sink for receiving and transferring the heat from the housing to the heat sink, and a plurality of semiconductor devices between the heat sink and heat source for transferring the heat by means of the current.

In the preferred embodiment of the present invention, a heat-transfer pipe encloses the housing, which has an opening equivalent to the opening of the housing for transferring the heat from the housing to the thermoelectric device. Also, a metal filter is installed at the opening of the heat-transfer pipe and transfers the heat of the gas to the thermoelectric device to decrease the temperature of the gas. Furthermore, a ceramic filter is installed at the opening of the housing in order to eliminate minute particles included in the gas.

At this time, the thermoelectric device utilizing a Peltier effect is attached to the housing of the inflator. Thus, upon starting the automobile, the thermoelectric device is supplied with the current from the battery of the automobile to cool the housing of the inflator down to a predetermined temperature. The cooled outer housing of the inflator absorbs the heat within the inflator, and the thermoelectric device externally discharges the heat, thereby decreasing the pressure and temperature of the gas in the event of the detonation of the explosive.

BRIEF DESCRIPTION OF THE DRAWINGS

The above objects and other advantages of the present invention will become more apparent by describing in detail the preferred embodiment thereof with reference to the attached drawings, in which.

DETAILED DESCRIPTION OF THE PREFERRED EMBODIMENTS

The construction and operation of a pyrotechnic inflator using a thermoelectric device according to one embodiment of the present invention will be described with reference to the accompanying drawings.

Figure 1:
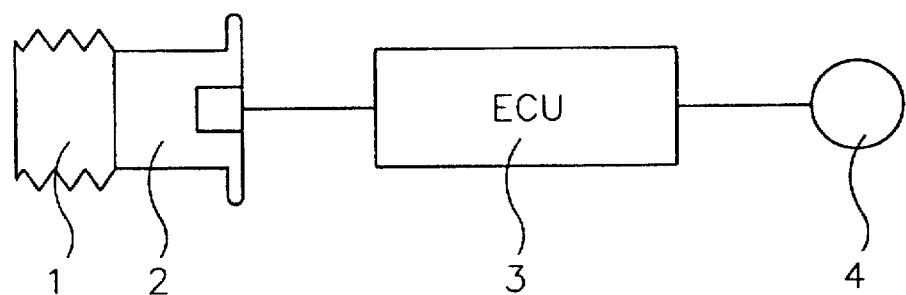
FIG. 1 is a view for showing the construction of a general air bag system.
Figure 2:
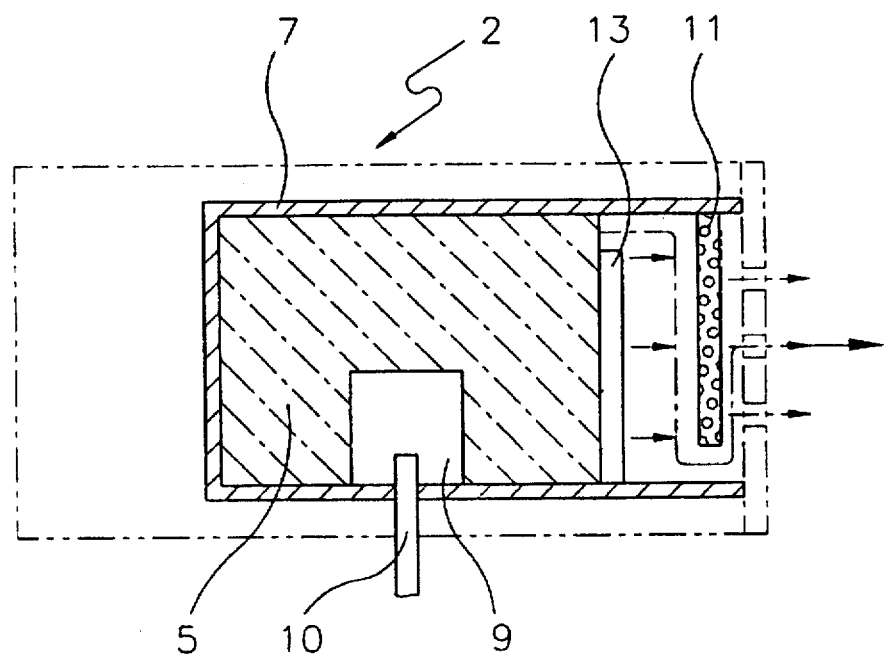
FIG. 2 is a sectional view for showing the structure of the inflator in the air bag system shown in FIG. 1.
Figure 3:
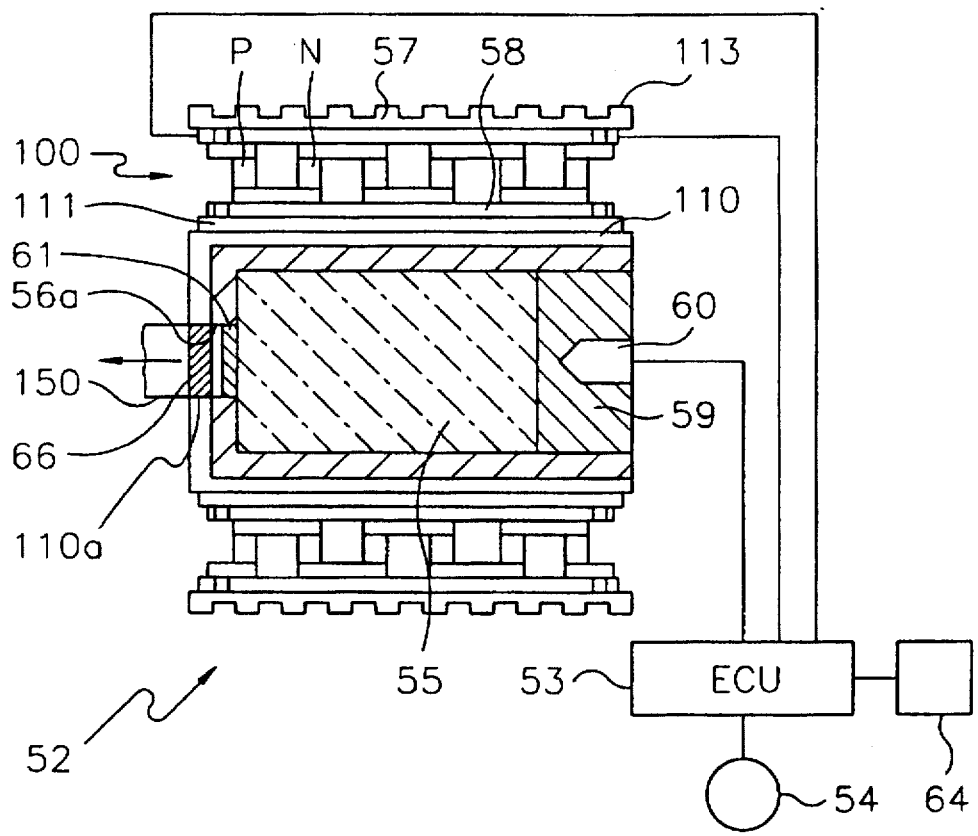
FIG. 3 is a sectional view for showing an inflator of an air bag system according to one embodiment of the present invention.

FIG. 3 is a sectional view for showing the structure of the inflator in the air bag system according to one embodiment of the present invention. As shown in FIG. 3, a housing 56 of inflator 52 using the thermoelectric device according to this embodiment is filled with an explosive 55, which is an explosive substance such as sodium nitrate ($NaNO_3$). An opening 56a, which forms a starting point of a linear flow passage 150 enabling the flowing of a gas generated when explosive 55 is detonated toward an air bag (not shown), is formed at one side of housing 56. A ceramic filter 61 is integrally formed with housing 56 at opening 56a toward explosive 55 for eliminating minute particles produced during the detonation of explosive 55. An ignition agent 59 for detonating explosive 55 is charged while in contact with one side of explosive 55, i.e., on the opposite side of opening 56a. An exploder 60 for flaring ignition agent 59 is installed (embedded) within ignition agent 59. Exploder 60 is connected to ECU 53, which is connected to a collision sensor 54. An accelerative signal generated from collision sensor 54 is supplied to ECU 53, which then determines whether or not the collision of a vehicle endangers a driver based on the accelerative signal. If ECU 53 determines that the driver is faced with danger, ECU 53 provides an explosion signal to exploder 60 to ignite ignition agent 59. Then, linear flow passage 150 is formed from opening 56a of housing 56, and allows a gas of high temperature and high pressure from inflator 52 to pass therethrough.

A heat-transfer pipe 110 is formed along the outer surface of housing 56, and heat-transfer pipe 110 transmits the heat of the high temperature gas resulting from the detonation and the heat of housing 56 to lower the temperature of the gas. Heat-transfer pipe 110 is formed with an opening 110a in a portion corresponding to opening 56a of housing 56 for forming the gas flow passage in association with opening 56a of housing 56. A cooling filter 66 is formed at opening 110a of heat-transfer pipe 110 in the straight advancing direction of the gas flow of the gas. Cooling filter 66 is constituted by a metal or a metal net to lower the temperature of the gas ejected due to the detonation of explosive 55.

A thermo-electric device 100 is formed on an outer surface of heat-transfer pipe 110, which includes a heat source 111, a heat sink 113 disposed opposite to heat source 111 and a thermo-electric semiconductor device between heat source 111 and heat sink 113. Such a thermo-electric device is disclosed in a patent, e.g., U.S. Pat. No. 5,040,381 issued to William Hazen et al. on Aug. 20, 1991.

Figure 4:
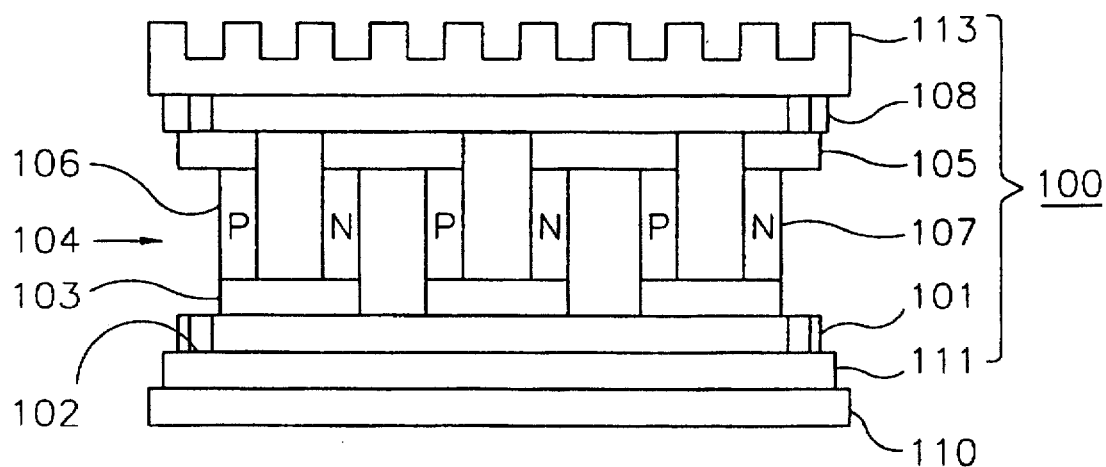
FIG. 4 is a sectional view for illustrating one embodiment of the thermoelectric device shown in FIG. 3.

FIG. 4 is a detailed sectional view for showing one embodiment of thermo-electric device 100 formed on heat-transfer pipe 110. Heat source 111, which is formed of a metal substance such as a copper, which has a high heat-transfer efficiency, is attached to heat-transfer pipe 110. Heat source 111 is attached with the thermo-electric semiconductor device. Also, heat source 111 is attached with a first alumina plate 101 formed of alumina ($Al_2O_3$), by means of a mechanical coupling unit. In order to remove a gap apt to receive air and provide a thermally uniform coupling, grease and the like fills in a clearance 102 between heat source 111 and first alumina plate 101. A first copper plate 103 etched via an epitaxy process is attached to first alumina plate 101. Etched first copper plate 103 is attached to directly face a negatively and positively doped semiconductor region 104 which are formed alternately. An etched second copper plate 105 is attached to the other side of semiconductor region 104. Etched first and second copper plates 103 and 105 provide a conductive path of current successively flowing from second copper plate 104 to first copper plate 102 via positive semiconductors (i.e., P-type semiconductor) 106. Negative semiconductors (i.e., N-type semiconductor) 107 provides a conductive path of the current flowing from first copper plate 103 to second copper plate 104. In the backward direction of a junction plane of etched copper plate 103 and semiconductor region 104, a second alumina plate 108 comprised of alumina $Al_2O_3$, is attached for receiving the heat from first alumina plate 101. Heat sink 113 for externally emitting the heat is attached to second alumina plate 108 via a mechanical coupling unit such as rivets or screws. Heat sink 113 is formed of a heavy metal such as the copper or aluminum having the high heat-transfer efficiency, and the outer periphery of one side thereof is formed to have a plurality of uneven planes to enhance the heat-transfer efficiency.

Etched first and second copper plates 103 and 105 within semiconductor region 104 are electrically connected to ECU 20. ECU 20 receives the current from a power source such as a battery 64 to supply the current to semiconductor region 104. When the current flows to semiconductor region 104, the heat is externally discharged from heat sink 113 via first alumina plate 101 and second alumina plate 108 in terms of the Peltier effect.

Heat source 111 in contact with heat-transfer pipe 110 receives the heat from inflator housing 56. The heat is transferred to heat sink 113 by means of the thermo-electric semiconductor device 100 which the current from battery 64 flows therethrough.

Cooling filter 66 composed of the metal or metal net integrally formed with heat-transfer pipe 110 in one-piece is installed to opening 110a of heat-transfer pipe 110 in the front proceeding direction of ceramic filter 61. Cooling filter 66 lowers the temperature of the gas ejected due to the detonation of explosive 55.

Here, thermoelectric device 100 installed to the outer surface of inflator housing 56 cools inflator housing 56 by means of the Peltier effect, according to which the heat is absorbed or emitted when the current flows along a junction plane of two dissimilar metals, as shown in FIG. 4. In other words, if the current is applied in the same direction of the current flowing through the (hot) junction plane involving the heat between the two junction planes within thermoelectric device 100, the heat is absorbed. Whereas, if the current is applied in the same direction of the current flowing the (cold) junction plane without evolving the heat between the two junction planes, the heat is emitted.

Therefore, upon the supply of the power from ECU 20, thermoelectric device 100 absorbs the heat from heat source 111 in contact with inflator housing 56 in conformity with the Peltier effect to externally emit the heat via heat sink 113. Thermoelectric device 100 is provided with a plurality of n-type semiconductors and p-type semiconductors for cooling inflator housing 56 down to approximately −30°−−40°.

A detailed description on an operation of the pyrotechnic inflator using the thermoelectric device according to one embodiment of the present invention constructed as above will be provided hereinbelow.

Figure 5:
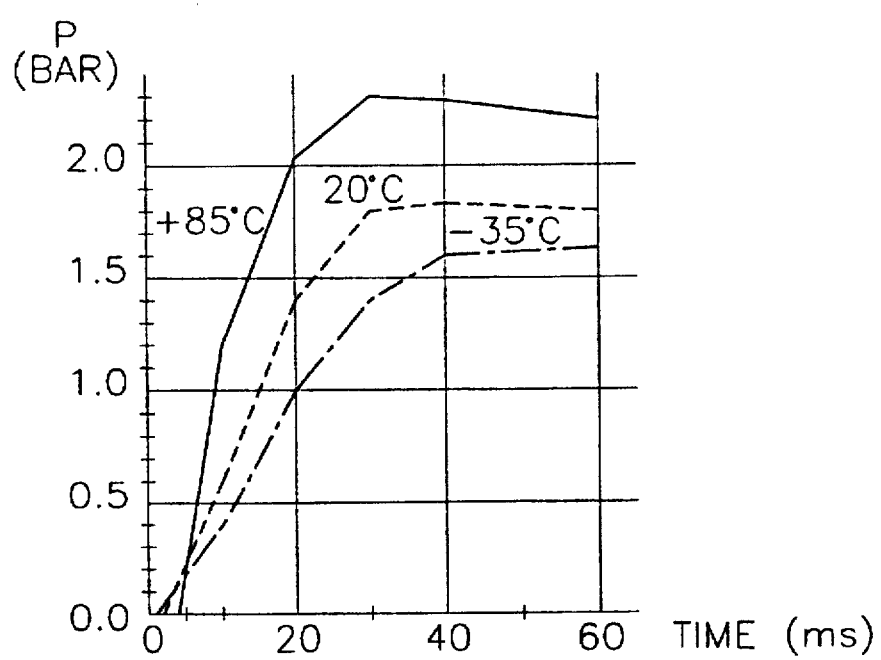
FIG. 5 is a graph representation plotting the relation between the temperature and gas ejecting pressure in the inflator.
Figure 6:
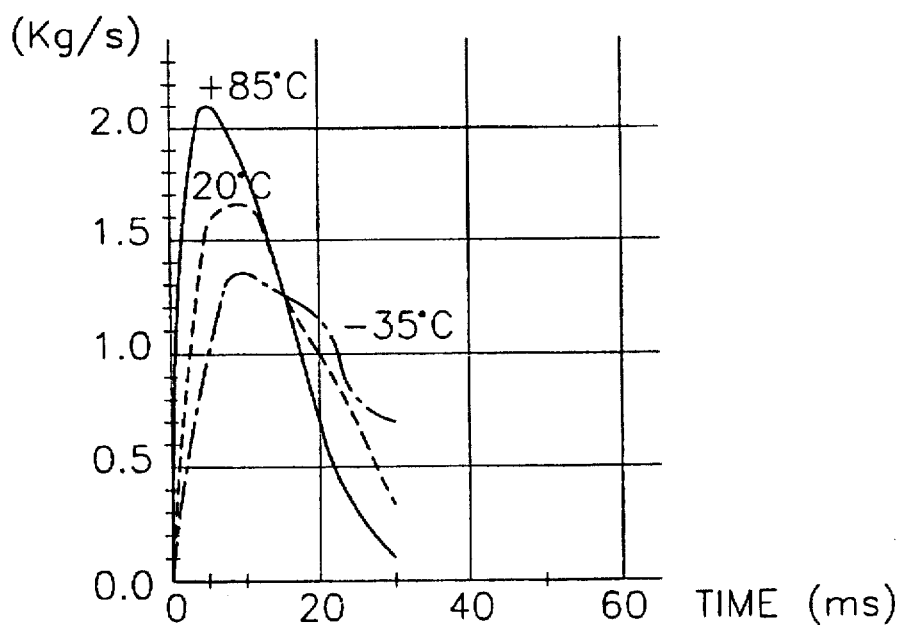
FIG. 6 is a graph representation plotting the relation between the temperature and particle mass of the gas ejected from the inflator.

FIG. 5 is a graph representation plotting the relation between the temperature and gas ejecting pressure in the inflator. FIG. 6 is a graph representation plotting the relation between the temperature and the flow rate of the gas ejected from the inflator. As illustrated in FIG. 3, exploder 60 is electrically connected to ECU 53. Two electrodes (not shown) of p-type and n-type semiconductors in thermoelectric device 100 are also electrically connected to ECU 53. When the automobile collides while driving on a road or is subjected to a collision, collision sensor 54 mounted to the predetermined place of the automobile monitors the collision to provide a predetermined signal to ECU 53. Once collision sensor 54 supplies a collision sensing signal to ECU 53, ECU 53 supplies an electrical signal to exploder 60 to operate exploder 60. When exploder 56 is operated to ignite ignition agent 59, explosive 55 which is the explosive substance such as sodium nitrate is detonated to generate the high temperature and high pressure gas.

Thermoelectric device 100 mounted at inflator 52 are supplied with the current from ECU 53 when an engine of the automobile is started to be supplied with the power of battery 64. By the supply of the power to thermoelectric device 100 by using ECU 53, the plurality of n-type semiconductors and p-type semiconductors attached to thermoelectric device 100 are electrically conducted. The heat is absorbed into heat source 111 in inflator housing 56, and externally emitted via heat sink 113 of thermoelectric device 100. Thus, inflator housing 56 is cooled, and cooling filter 66 installed to the front of ceramic filter 61 connected to inflator housing 56 is cooled to approximately −30°−−40°. Thermoelectric device 100 lowers the temperature of inflator housing 56 at the moment the automobile is started by ignition.

At this time, the heat of the gas generated by the detonation of explosive 55 in inflator 52 caused by the supply of the collision sensing signal of the running automobile from collision sensor 54 to ECU 53 is absorbed by inflator housing 56 under the cooled state.

The impure minute particles in the gas emitted from inflator 52 are eliminated via ceramic filter 61. When thermoelectric device 100 is cooled, cooling filter 66 having the net structure of the metal such as the copper formed to the outer side of ceramic filter 61 is also cooled, thereby lowering the temperature of the gas from inflator 52 while the gas passes through cooling filter 66. The gas purified and cooled down via ceramic filter 61 and cooling filter 66 flows into the air bag (not shown) to unfold the air bag.

As represented in FIG. 5, the peak explosion pressure of the explosive within the inflator is 2.3 bar provided that the temperature of the outer housing of the conventional inflator is 85° C. The temperature goes down to approximately 1.75 bar at a temperature of 20° C., and to approximately 1.6 bar at −35° C. Therefore, when the temperature of the housing is cooled to −35° C., the peak explosion pressure of the explosive within the inflator becomes 1.6 bar. When thermoelectric device 100 is utilized to cool the temperature of the inflator housing down to be below −35° C., the explosion pressure of the explosive included in the inflator is decreased by up to roughly 30−35%. Consequently, the pressure of the gas generated when the explosive is detonated, is sufficiently decreased even though the structure of the gas flow passage is not complicatedly formed in the inflator.

FIG. 6 is a graph plotting the relation between the temperature and amount of dust in the gas ejected from the inflator. As represented in FIG. 6, when the temperature of the outer housing of the inflator is −35° C., the peak flow rate of the mass generated when the explosive within the inflator is detonated is approximately 2.12 Kg/s in case that the temperature of the inflator housing is roughly 85° C.; whereas it is approximately 1.34 Kg/s for −35° C. Consequently, the peak substance flux generated at −35° C. is decreased by as much as roughly 30−40% as compared with that generated at 85° C. when the explosive is detonated. Thus, the flow rate of the mass generated when the explosive is detonated can be reduced without furnishing the plurality of filters to the inflator.

According to the present invention, the inflator housing maintains the cooled state to lower the temperature of the gas generated when the explosive is detonated. Therefore, the peak explosion pressure is reduced not to require the complicatedly-designed structure incurred owing to the cooling flow passage and filters within the inflator housing. As a result, the structure of the inflator can be simplified to facilitate the manufacturing thereof which, in turn, the manufacturing cost is lowered.

While the present invention has been shown and described with reference to a particular embodiment thereof, it will be understood by those skilled in the art that various changes in form and details may be effected therein without departing from the spirit and scope of the invention as defined by the appended claims.

What is claimed is:

1. An inflator comprising:
    a housing having a space filled with an explosive substance therein and an opening for forming a linear flow passage for ejecting a gas generated due to a detonation of the explosive substance to an air bag;
    an ignition agent for detonating the explosive substance;
    an exploder embedded in said ignition agent for being driven by receiving an explosion signal to ignite said ignition agent; and
    a thermoelectric device for receiving a current to cool said housing down to a predetermined temperature.

2. An inflator as claimed in claim 1, wherein said thermoelectric device is formed on an outer surface of said housing.

3. An inflator as claimed in claim 1, wherein said thermoelectric device is supplied with a current from a power source and the current supply from the power source to said thermoelectric device is controlled by an electronic control unit, wherein said thermoelectric device comprises a heat sink for emitting a heat, a heat source disposed opposite to said heat sink for receiving and transferring the heat from said housing to said heat sink, and a plurality of semiconductor devices between said heat sink and heat source for transferring the heat by means of the current.

4. An inflator as claimed in claim 1, further comprising a heat-transfer pipe having an opening corresponding to the opening of said housing, for transferring the heat from said housing to said thermoelectric device while enclosing said housing.

5. An inflator as claimed in claim 4, further comprising a metal filter for transferring the heat of the gas to said thermoelectric device to lower a temperature of the gas, said metal filter being provided at the opening of said heat-transfer pipe comprises.

6. An inflator as claimed in claim 1, wherein the predetermined temperature ranges from −30° C. to −40° C.

7. An inflator as claimed in claim 1, further comprising a ceramic filter installed to the opening of said housing for eliminating minute particles included in the gas.

8. An inflator comprising:

a housing having a space filled with an explosive substance therein and an opening for forming a linear flow passage for ejecting a gas generated due to a detonation of the explosive substance to an air bag;

an ignition agent for detonating the explosive substance;

an exploder embedded in said ignition agent for being driven by receiving an explosion signal to ignite said ignition agent;

a thermoelectric device for receiving a current to cool said housing down to a predetermined temperature, said thermoelectric device being formed on an outer surface of said housing, said thermoelectric device being supplied with a current from a power source, the current supply from the power source to said thermoelectric device being controlled by an electronic control unit, wherein said thermoelectric device comprises a heat sink for emitting a heat, a heat source disposed opposite to said heat sink for receiving and transferring the heat from said housing to said heat sink, and a plurality of semiconductor devices between said heat sink and heat source for transferring the heat by means of the current;

a heat-transfer pipe having an opening corresponding to the opening of said housing, for transferring the heat from said housing to said thermoelectric device while enclosing said housing;

a metal filter for transferring the heat of the gas to said thermoelectric device to lower a temperature of the gas, said metal filter being provided at the opening of said heat-transfer pipe; and a ceramic filter installed to the opening of said housing for eliminating minute particles included in the gas.

* * * * *